United States Patent
Doerr et al.

(10) Patent No.: US 7,343,104 B2
(45) Date of Patent: Mar. 11, 2008

(54) APPARATUS AND METHOD FOR RECEIVING A QUADRATURE DIFFERENTIAL PHASE SHIFT KEY MODULATED OPTICAL PULSETRAIN

(75) Inventors: Christopher R. Doerr, Middletown, NJ (US); Douglas M. Gill, South Orange, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 548 days.

(21) Appl. No.: 10/875,016

(22) Filed: Jun. 23, 2004

(65) Prior Publication Data

US 2005/0286911 A1  Dec. 29, 2005

(51) Int. Cl.
*H04B 10/06* (2006.01)
(52) U.S. Cl. ..................... 398/212
(58) Field of Classification Search ............. 398/212
See application file for complete search history.

(56) References Cited

U.S. PATENT DOCUMENTS

| | | | |
|---|---|---|---|
| 5,253,097 A | * | 10/1993 | Naito et al. ............ 398/205 |
| 5,454,012 A | * | 9/1995 | Takai et al. ............ 375/295 |
| 6,626,589 B1 | * | 9/2003 | Epworth ............... 398/54 |
| 2004/0218932 A1 | * | 11/2004 | Epworth et al. ......... 398/202 |
| 2006/0056845 A1 | * | 3/2006 | Parsons et al. ......... 398/41 |

OTHER PUBLICATIONS

Griffin et al; Optical Differential Quadrature Phase-Shift Key (oDQPSK) for High Capacity Optical Transmission; OFC 2002, WX6, Anaheim, CA, USA, Mar. 2002; pp. 367-368.

* cited by examiner

*Primary Examiner*—Leslie Pascal

(57) ABSTRACT

An optical differential phase shift key (DPSK) receiver, a method of demodulating an optical DPSK modulated signal and an optical processor capable of operating as either a DPSK receiver or DPSK transmitter. In one embodiment, the DPSK receiver includes: (1) an optical waveguide and a delay line associated therewith configured to receive simultaneously an optical DPSK modulated signal, (2) a coupler having at least two inputs and at least four outputs, the at least two inputs configured to terminate the optical waveguide and the delay line, the delay line having a path length difference that delays the optical DPSK modulated signal by at least one timeslot relative to the optical waveguide and (3) photodetectors associated with the at least four outputs and configured to provide signals indicative of digital data contained in components of the optical DPSK modulated signal.

25 Claims, 3 Drawing Sheets

APPARATUS AND METHOD FOR RECEIVING A QUADRATURE DIFFERENTIAL PHASE SHIFT KEY MODULATED OPTICAL PULSETRAIN

TECHNICAL FIELD OF THE INVENTION

The present invention is directed, in general, to optical communication systems and, more specifically, to an apparatus and method for receiving a quadrature differential phase shift key (DQPSK) modulated optical pulsetrain.

BACKGROUND OF THE INVENTION

Optical transmission systems built around optical fibers have become widely used for broadband communication of digital data. Differential phase shift keying (DPSK) is a modulation technique that is widely used for transforming the digital data into optical pulses carried by the optical fibers. DPSK's coding scheme assigns phase shifts between adjacent symbols to numbers (zero and one, since digital data is predominantly binary). Timeslots are defined, and an optical pulse is generated during each timeslot. The optical pulse in each timeslot is phase-shifted from the optical pulse in the preceding timeslot as a function of the coding scheme to transmit the digital data from a transmitter to a receiver. Binary DPSK (DBPSK) carries one bit per optical pulse. Quadrature DPSK (DQPSK) expands the bandwidth binary DPSK offers by dividing each optical pulse into DPSK-modulated in-phase and quadrature components, allowing two bits to be carried per optical pulse. DPSK can encompass still higher constellation transmission formats and therefore higher numbers of bits per pulse.

Conventional optical DQPSK receivers (an optical processor that receives pulsetrains) demodulate the received DQPSK-modulated optical pulses by first dividing the pulsetrain into two identical components labeled in-phase (I) and quadrature (Q). Then, for each of the I and Q pulse components, predecessor and successor pulse components are made to interfere with each other. Each interference reveals the phase-shift in each component and thus the digital data contained in the optical pulse.

To perform these functions, conventional optical DQPSK receivers first use a splitter to divide the optical components into I and Q. Then, two separate interferometers cause the predecessor and successor I pulse components to interfere with each other and the predecessor and successor Q pulse components to interfere with each other. Finally, a differential receiver pair associated with each of the interferometers detects the resulting interference of both the I and Q pulse components. One example of a conventional optical DQPSK receiver is described in Griffin, et al., "Optical Differential Quadrature Phase-Shift Key (oDQPSK) for High Capacity Optical Transmission," OFC 2002, WX6, Anaheim, Calif., USA, March 2002, incorporated herein by reference.

Each interferometer in the optical DQPSK receiver uses a delay line to delay predecessor pulses. The delay in each delay line must be adjusted continually to ensure a proper coincidence of the predecessor and successor pulses. A heating unit performs this function. Each of the two delay lines requires its own heating unit. Thus, a conventional DQPSK receiver requires two heating units. Unfortunately, heating units (and their associated thermostat control circuitry) require electric power, which is why such delay lines are called "active." Heating units in fact consume significant electric power.

The two interferometers must also be polarization-independent. That is, the propagation velocity of the pulses through the interferometers should not depend upon their polarization. Unfortunately, it is difficult and therefore expensive to produce a receiver having a pair of polarization-independent interferometers.

It is apparent that optical DQPSK receivers require several optical elements to function, which, like all optical devices, should be precisely aligned with each other to ensure proper reception. For this reason and to render the receiver as small as possible, conventional optical DQPSK receivers are typically formed in or on a "silicon optical bench," or SiOB, which constitutes an optical substrate for the optical elements.

What is needed in the art is a design for an optical DQPSK pulsetrain processor that has fewer optical elements, especially active elements, and thus is capable of attaining smaller sizes and lower complexity than conventional optical DQPSK optical processors.

SUMMARY OF THE INVENTION

To address the above-discussed deficiencies of the prior art, the present invention introduces a new design for an optical DQPSK processor that consumes less power, requires less control circuitry and has fewer optical elements than those of the prior art.

In one aspect, the present invention provides a DPSK receiver. In one embodiment, the DPSK receiver includes: (1) an optical waveguide and a delay line associated therewith configured to receive simultaneously an optical DPSK modulated signal, (2) a coupler having at least two inputs and at least four outputs, the at least two inputs configured to terminate the optical waveguide and the delay line, the delay line having a path length difference that delays the optical DPSK modulated signal by at least one timeslot relative to the optical waveguide and (3) photodetectors associated with the at least four outputs and configured to provide signals indicative of digital data contained in components of the optical DPSK modulated signal.

In another aspect, the present invention provides a method of demodulating an optical DPSK modulated signal. In one embodiment, the method includes: (1) receiving two instances of the optical DPSK modulated signal that are timeslot-shifted (by at least one timeslot) with respect to one another into two inputs of a coupler having at least four outputs and (2) employing photodetectors at four of the at least four outputs to provide signals indicative of digital data contained in components of the optical DPSK modulated signal.

In yet another aspect, the present invention provides an optical processor for processing and demodulating an optical DQPSK modulated pulsetrain. In one embodiment, the optical processor includes: (1) an optical waveguide, (2) a delay line having a path length difference relative to the optical waveguide of at least a timeslot of a DQPSK modulated pulsetrain, (3) a coupler having at least two ports on one side thereof and at least four ports on an opposing side thereof, the optical waveguide and the delay line terminating in the at least two ports and (4) optoelectric converters associated with the at least four ports and configured to convert energy between the optical DQPSK modulated pulsetrain and electrical signals indicative of digital data contained in both I and Q components thereof. "Ports" is a generic term for inputs and outputs on a coupler.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
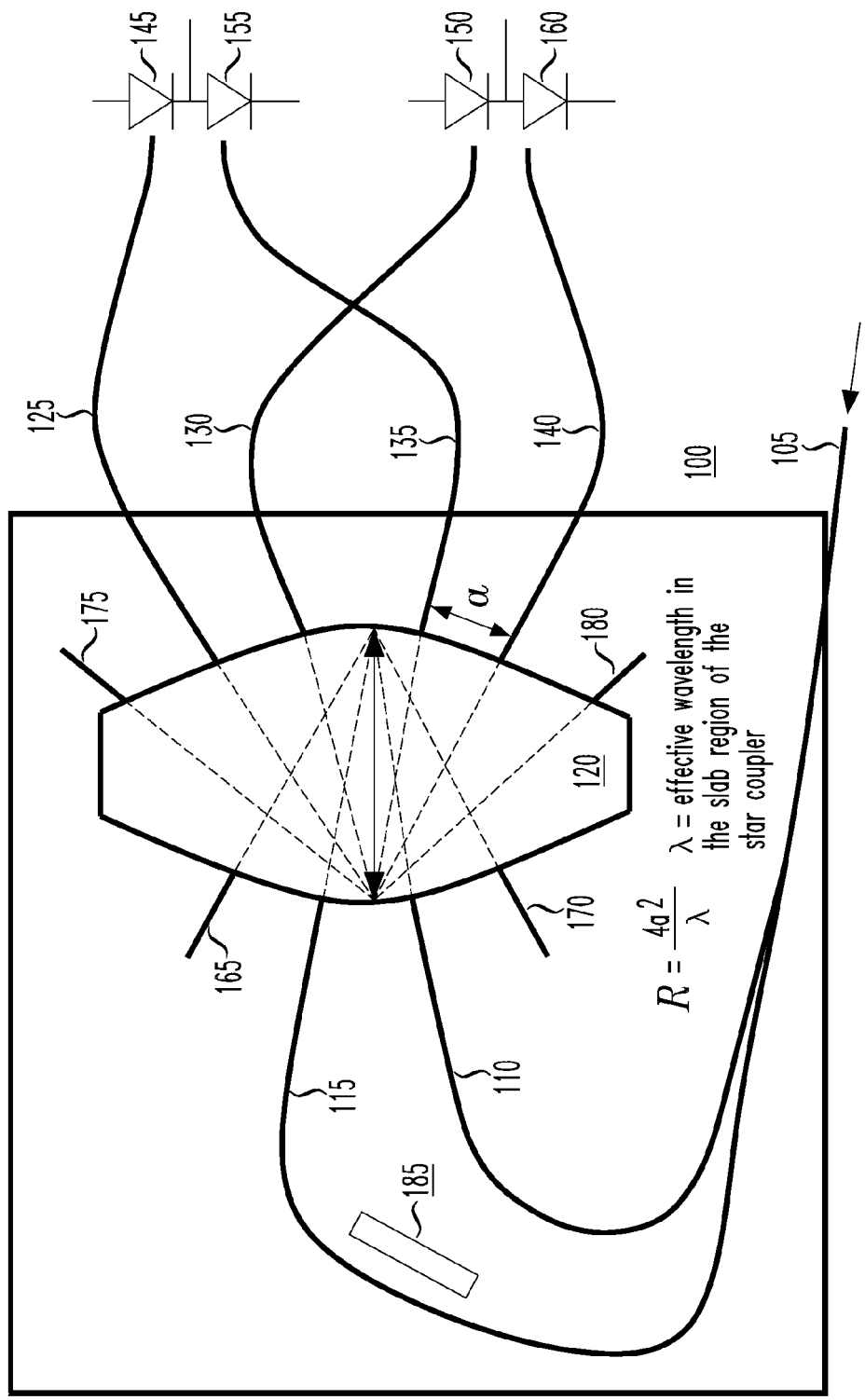
FIG. 1 illustrates a block diagram of one embodiment of an optical DQPSK processor constructed according to the principles of the present invention.

Referring initially to FIG. 1, illustrated is a block diagram of one embodiment of an optical DQPSK processor 100 constructed according to the principles of the present invention. The illustrated embodiment of the processor resides on a "silicon optical bench" (SiOB), which provides an optical substrate for supporting the various optical (and electrical) elements of the optical DQPSK processor 100. However, those skilled in the pertinent art will realize that other support apparatus may be used in lieu of SiOB.

The optical DQPSK processor 100 includes an optical port 105, which functions as an input port if the optical DQPSK processor 100 is a receiver and an output port if the optical DQPSK processor 100 is a transmitter. The optical port 105 is coupled to an optical waveguide 110 and a delay line 115 that is associated with the optical waveguide 110. ("Delay line" is defined broadly to include any structure that introduces a delay relative to the optical waveguide 110.) When the optical DQPSK processor 100 is a receiver, the optical waveguide 110 and the delay line receive simultaneously an optical DQPSK modulated pulsetrain or, more generally, an optical DQPSK signal, via the optical port 105.

As those skilled in the pertinent art understand, an optical DQPSK modulated pulsetrain is a sequence of optical pulses of wavelength $\lambda$ in timeslots of duration T. Each optical pulse has in-phase and quadrature components and, in the illustrated embodiment, contains two bits of digital data. Though the illustrated embodiment of the present invention is directed to processing of DQPSK optical pulsetrains, those skilled in the pertinent art will further understand that the principles of the present invention apply to optical pulsetrains having components that are offset from one another by other than 90° and further to optical pulsetrains having more than two components. Those skilled in the art also recognize that digital data may be embodied in DQPSK optical signals, which are not pulsed.

The optical waveguide 110 and the delay line 115 terminate in two inner inputs of a star coupler 120 having at least two inputs and at least four outputs. In the illustrated embodiment, the star coupler 120 is a 4×4 star coupler having four inputs and six outputs. As those skilled in the pertinent art are familiar, the outer inputs and outputs on each side of a star coupler are typically reserved for dummy waveguides. The illustrated embodiment of the star coupler 120 in fact has such dummy waveguides 165, 170, 175, 180.

The center-to-center spacing, $\Delta\theta$, between waveguides at the free-space region boundary of the at least two inputs is a function of the wavelength $\lambda$ of the DQPSK modulated pulsetrain and a radius R of the star coupler. Likewise, the center-to-center spacing, $\Delta\theta$, of the at least four outputs is a function of the wavelength $\lambda$ and the radius R. In the illustrated embodiment, $\Delta\theta = \frac{1}{2}\sqrt{\lambda R}$. FIG. 1 illustrates these relationships.

Separate instances of the optical DQPSK modulated pulsetrain travel through the optical waveguide 110 and the delay line 115. The delay line 115 introduces a path length difference $\Delta L$ that translates into a delay equaling the timeslot T into the optical DQPSK modulated pulsetrain it is carrying. Delays of more than one timeslot also fall within the broad scope of the present invention. A heating element 185 controls the temperature of the delay line 115 to maintain $\Delta L$ such that the proper phase relationship is maintained between the two instances of the optical DQPSK modulated pulsetrain. (The heating element 185 may not be necessary in some embodiments of the present invention.) The result is that when the two instances of the optical DQPSK modulated pulsetrain enter the star coupler 120, adjacent pulses coincide, superpose and interfere with one another.

The resulting interference patterns follow optical paths within the star coupler 120, eventually arriving at the at least four outputs. Waveguides 125, 130, 135, 140 terminate in respective optoelectric converters 145, 150, 155, 160. Since, the illustrated embodiment of the optical DQPSK processor 100 is a receiver, the optoelectric converters 145, 150, 155, 160 are photodetectors, more specifically photodiodes, arranged in differential pairs. The differential pairs offer increased sensitivity. However, some embodiments of the present invention may not require increased sensitivity. In such embodiments, one detector and one output waveguide in each differential pair may be omitted; single-ended detectors are used instead.

Were the optical DQPSK processor 100 to function as a transmitter, the optoelectric converters 145, 150, 155, 160 would typically take the form of Mach-Zehnder electro-optic modulators or perhaps solid-state lasers. Those skilled in the art are familiar with various optoelectric conversion devices and will realize that the broad scope of the present invention is not limited to a particular type of optoelectric converter.

The resulting interference patterns enter the four waveguides 125, 130, 135, 140 and impinge on the respective four optoelectric converters 145, 150, 155, 160. Each optoelectric converter 145, 150, 155, 160 produces an electric signal indicative of the digital data contained in both I and Q components of the optical DQPSK modulated pulsetrain. The electric signals have a magnitude that is related to the differential phase of each optical pulse of the optical DQPSK modulated pulsetrain. Furthermore, R and $\Delta\theta$ are chosen such that the magnitudes of the electrical signals produced by the optoelectric converter 145: $\frac{u}{2}\left[1+\exp\left(j\beta\Delta L+j\frac{3\pi}{4}\right)\right]$ optoelectric converter 150: $\frac{u}{2}\left[1+\exp\left(j\beta\Delta L+j\frac{\pi}{4}\right)\right]$ optoelectric converter 155: $\frac{u}{2}\left[1+\exp\left(j\beta\Delta L-j\frac{\pi}{4}\right)\right]$ optoelectric converter 160: $\frac{u}{2}\left[1+\exp\left(j\beta\Delta L-j\frac{3\pi}{4}\right)\right]$ The relative magnitudes of the electrical signals produced by the optoelectric converters 145, 150, 155, 160 yields the identity of the digital data by yielding the differential phase (phasor direction). Coupling the optoelectric converters 145, 155 in one differential pair and the optoelectric converters 150, 160 in another differential pair can yield this outcome. If the electric signals produced by the optoelectric converters 145, 150 are greater than those produced by the optoelectric converters 155, 160, the two bits of digital data may be, e.g., "1,1". If the electric signals produced by the optoelectric converters 145, 160 are greater than those produced by the optoelectric converters 150, 155, the two bits of digital data may be, e.g., "1,0". If the electric signals produced by the optoelectric converters 150, 155 are greater than those produced by the optoelectric converters 145, 160, the two bits of digital data may be, e.g., "0,1". If the electric signals produced by the optoelectric converters 150, 160 are greater than those produced by the optoelectric converters 145, 155, the two bits of digital data may be, e.g., "0,0". Of course, these examples depend entirely upon the particular way the DQPSK constellation is mapped onto the digital data.

Figure 2:
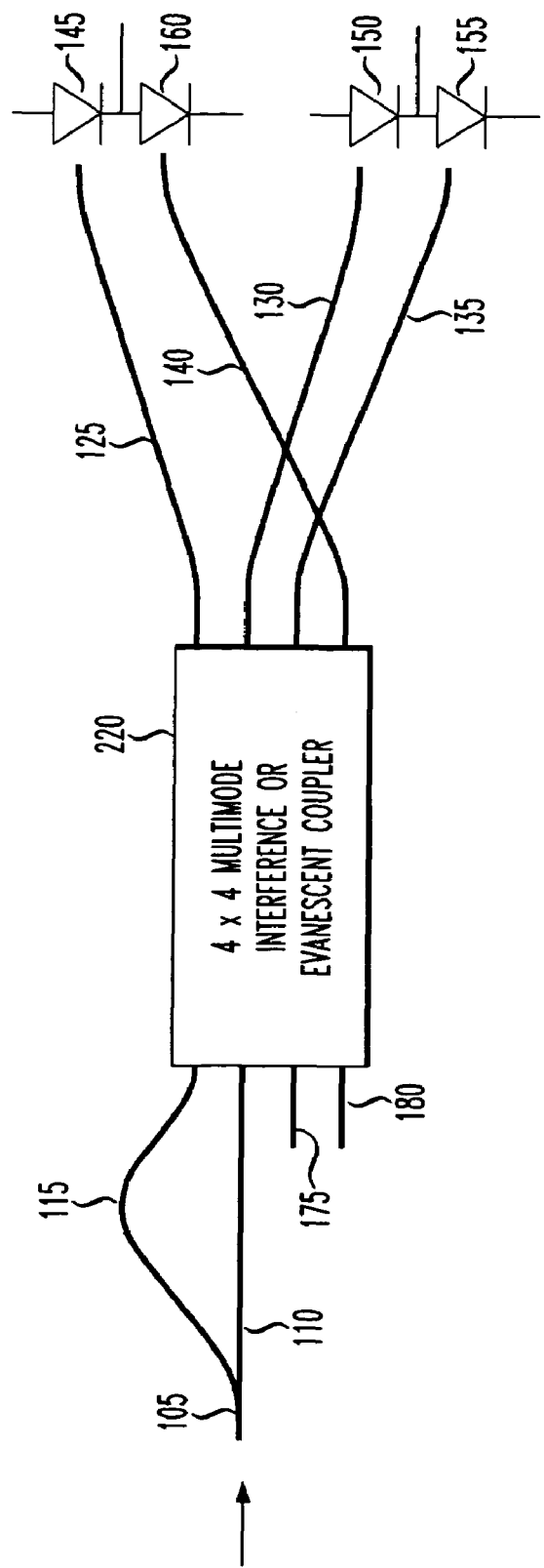
FIG. 2 illustrates a block diagram of another embodiment of an optical DQPSK processor constructed according to the principles of the present invention.

Turning now to FIG. 2, illustrated is a block diagram of another embodiment of an optical DQPSK processor constructed according to the principles of the present invention. FIG. 2 is presented to illustrate that a multimode interference coupler or evanescent coupler 220 can be substituted for the star coupler 120 of FIG. 1. In FIG. 2, the multimode interference coupler or evanescent coupler 220 is a 4×4 multimode interference coupler or evanescent coupler 220. When such substitution is made, the differential pair arrangement differs from that of FIG. 1. In FIG. 2, the optoelectric converter 145, 160 can be coupled in one differential pair and the optoelectric converter 150, 155 coupled in another differential pair to yield the desired differential outputs.

Figure 3:
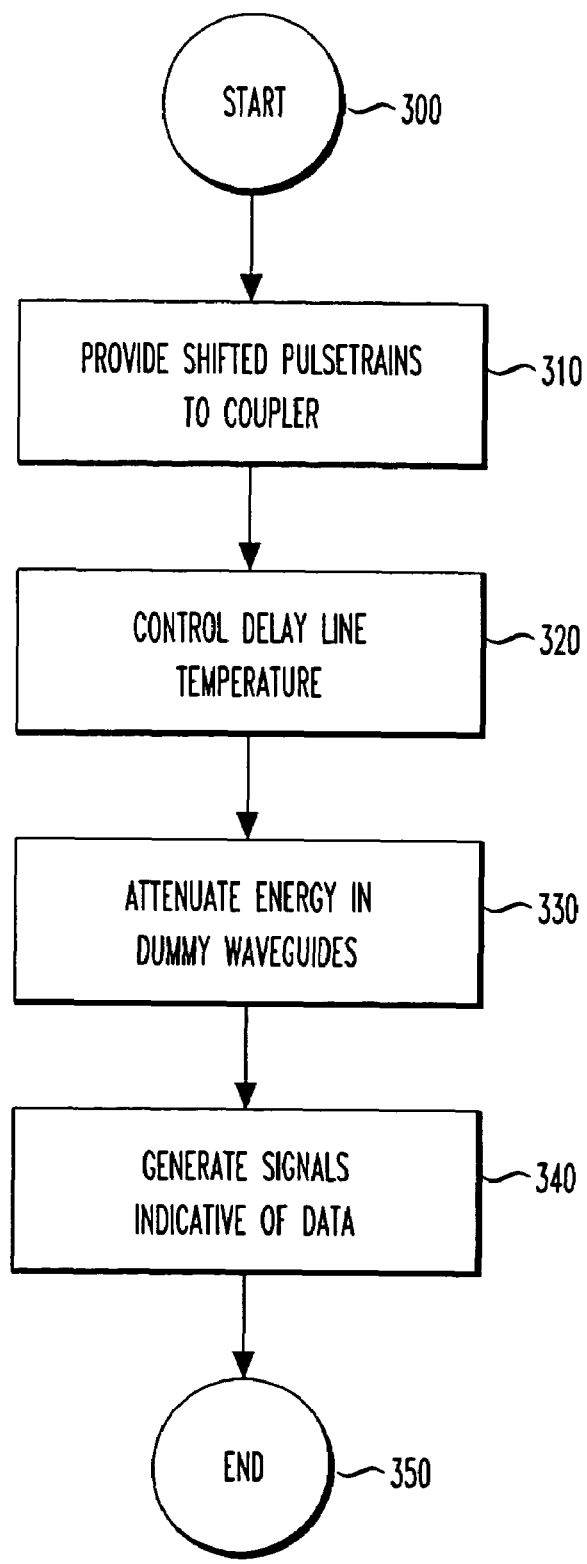
FIG. 3 illustrates a flow diagram of one embodiment of a method of demodulating an optical DQPSK modulated signal constructed according to the principles of the present invention.

Turning now to FIG. 3, illustrated is a flow diagram of one embodiment of a method of demodulating an optical DQPSK modulated pulsetrain constructed according to the principles of the present invention. The method begins in a start step 300 when it is desired to receive and decode an optical DQPSK modulated pulsetrain. The method proceeds to a step 310 wherein two instances of the optical DQPSK modulated pulsetrain that are timeslot-shifted with respect to one another are received into two inputs of a star coupler having at least four outputs. Two separate paths, one being a delay line that introduces a delay relative to the other one, can provide the timeslot shifting. In an optional step 320, the temperature of the delay line is controlled to maintain the relative temporal displacement of the two instances. In an optional step 330, optical energy is attenuated in dummy waveguides associated with certain inputs and outputs of the star coupler.

The method proceeds to a step 340 wherein photodetectors are employed at four of the at least four outputs to generate signals indicative of digital data contained in both I and Q components of the optical DQPSK modulated pulsetrain. The method ends in an end step 350.

While the method disclosed herein has been described and shown with reference to particular steps performed in a particular order, those skilled in the pertinent art will understand that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. An optical differential phase shift key (DPSK) receiver, comprising:
    an optical waveguide and a delay line associated therewith configured to receive simultaneously an optical DPSK modulated signal;
    a star coupler having at least two inputs, at least four outputs and a radius of curvature, said at least two inputs configured to terminate said optical waveguide and said delay line, said delay line having a path length difference that delays said optical DPSK modulated signal, relative to said optical waveguide, by at least one timeslot for said receiver; and
    photodetectors associated with at least two of said at least four outputs and configured to provide signals indicative of digital data contained in components of said optical DPSK modulated signal, wherein an angular separation between said at least two inputs is substantially half of a product of a square root of said radius of curvature and a wavelength of said optical DPSK modulated signal that said receiver is configured to receive.

2. The receiver as recited in claim 1 wherein said photodetectors are single-ended detectors associated with only two of said at least four outputs.

3. The receiver as recited in claim 1 wherein said photodetectors are differential pairs associated with four of said at least four outputs.

4. The receiver as recited in claim 1 wherein said optical DPSK modulated signal is an optical DQPSK modulated signal.

5. The receiver as recited in claim 1 wherein said receiver is embodied in a silicon optical bench (SiOB).

6. The receiver as recited in claim 1 wherein an angular separation of said at least four outputs is wherein an angular separation between said at least four outputs is substantially half of said product of said square root of said radius of curvature and said wavelength of said optical DPSK modulated signal that said receiver is configured to receive.

7. The receiver as recited in claim 1 wherein a heating element associated with said delay line modifies an effective path length thereof to maintain said timeslot delay.

8. The receiver as recited in claim 1 wherein said photodetectors are photodiodes.

9. A method of demodulating an optical differential phase shift key (DPSK) modulated signal, comprising:
    receiving two instances of said optical DPSK modulated signal that are timeslot-shifted with respect to one another into two inputs of a star coupler having at least four outputs and a radius of curvature; and employing photodetectors at least two of said at least four outputs to provide signals indicative of digital data contained in components of said optical DPSK modulated signal, wherein an angular separation between said two inputs is substantially half of a product of a square root of said radius of curvature and a wavelength of said optical DPSK modulated signal.

10. The method of claim 9, wherein output signals at said at least four outputs have a substantially equidistant phase relationship with one another.

11. The method as recited in claim 9 wherein said photodetectors are single-ended detectors associated with only two of said at least four outputs.

12. The method as recited in claim 9 wherein said photodetectors are differential pairs associated with four of said at least four outputs.

13. The method as recited in claim 9 wherein said optical DPSK modulated signal is an optical DQPSK modulated signal.

14. The method as recited in claim 9 wherein said method is carried out in a silicon optical bench (SiOB).

15. The method as recited in claim 9 wherein an angular separation of said at least four outputs is substantially half of said product of said square root of said radius of curvature of said radius of curvature and said wavelength of said optical DPSK modulated signal.

16. The method as recited in claim 9 further comprising controlling a temperature of a delay line containing one of said two instances to maintain a temporal displacement of said two instances.

17. The method as recited in claim 9 wherein said photodetectors are photodiodes.

18. An optical processor, comprising:
an optical waveguide;
a delay line having a path length difference relative to said optical waveguide that introduces a delay of at least a timeslot of an optical differential quadrature phase shift keyed (DQPSK) modulated signal;
a coupler having at least two ports on one side thereof and at least four ports on an opposing side thereof, said optical waveguide and said delay line terminating in said at least two ports, said coupler being
a star coupler having a radius of curvature and
optoelectric converters associated with at least two of said at least four ports and configured to convert energy between said optical DQPSK modulated signal and electrical signals indicative of digital data contained in both I and Q components thereof, wherein an angular separation between said at least two ports on one side is substantially half of a product of a square root of said radius of curvature of said star coupler and a wavelength of said optical DPSK modulated signal that said optical processor is configured to receive.

19. The optical processor as recited in claim 18 wherein an angular separation of said at least four ports, wherein an angular separation between said at least four ports is substantially half of said product of said square root of said radius of curvature of said star coupler and said wavelength.

20. The optical processor as recited in claim 18 wherein an angular separation of six ports is substantially half of said product of said square root of said radius of curvature of said star coupler and said wavelength.

21. The DPSK receiver of claim 20, wherein output signals at said at least four outputs have a substantially equidistant phase relationship with one another.

22. The optical processor of claim 20, wherein output signals at said at least four ports have a substantially equidistant phase relationship with one another.

23. The optical processor as recited in claim 18 wherein a heating element associated with said delay line modifies an effective path length thereof to maintain said timeslot delay.

24. The optical processor as recited in claim 18 wherein said optoelectric converters are photodetectors and said optical processor is a receiver.

25. The optical processor as recited in claim 18 wherein said optical processor is embodied in a silicon optical bench (SiOB).

\* \* \* \* \*